US012256481B2

(12) United States Patent
Sterz et al.

(10) Patent No.: US 12,256,481 B2
(45) Date of Patent: Mar. 18, 2025

(54) HOUSEHOLD MICROWAVE APPLIANCE HAVING MODE VARIATION APPARATUS

(71) Applicant: BSH Hausgeräte GmbH, Munich (DE)

(72) Inventors: Sebastian Sterz, Großaitingen (DE); Markus Kuchler, Gstadt am Chiemsee (DE); Kerstin Rigorth, Mühldorf (DE); Matthias Vogt, Obersulm (DE)

(73) Assignee: BSH Hausgeräte GmbH, Munich (DE)

( * ) Notice: Subject to any disclaimer, the term of this patent is extended or adjusted under 35 U.S.C. 154(b) by 718 days.

(21) Appl. No.: 17/624,855

(22) PCT Filed: Jul. 7, 2020

(86) PCT No.: PCT/EP2020/069062
§ 371 (c)(1),
(2) Date: Jan. 5, 2022

(87) PCT Pub. No.: WO2021/005030
PCT Pub. Date: Jan. 14, 2021

(65) Prior Publication Data
US 2022/0264711 A1 Aug. 18, 2022

(30) Foreign Application Priority Data
Jul. 9, 2019 (DE) ..................... 10 2019 210 119.4

(51) Int. Cl.
*H05B 6/68* (2006.01)
*H05B 6/64* (2006.01)
(Continued)

(52) U.S. Cl.
CPC ............. *H05B 6/68* (2013.01); *H05B 6/6432* (2013.01); *H05B 6/6411* (2013.01); *H05B 6/725* (2013.01); *H05B 6/74* (2013.01)

(58) Field of Classification Search
CPC ...... H05B 6/6411; H05B 6/6432; H05B 6/68; H05B 6/705; H05B 6/725; H05B 6/74; H05B 6/745; F24C 7/081
(Continued)

(56) References Cited

U.S. PATENT DOCUMENTS 3,679,908 A 7/1972 Mazza
4,354,153 A * 10/1982 Lentz ..................... G01R 21/01 324/95
(Continued)

FOREIGN PATENT DOCUMENTS

DE 19537755 A1 4/1997
EP 2148553 A1 1/2010
EP 2152047 A1 2/2010

OTHER PUBLICATIONS

International Search Report PCT/EP2020/069062 date Sep. 22, 2020.

*Primary Examiner* — Quang T Van
(74) *Attorney, Agent, or Firm* — Michael E. Tschupp; Andre Pallapies; Brandon G. Braun

(57) ABSTRACT

A household microwave appliance includes a cooking chamber exposable to microwaves. A mode variation apparatus modifies a field distribution of the microwaves in the cooking chamber, and a microwave leakage sensor detects a microwave leakage radiation exiting from the cooking chamber. The household microwave appliance is designed to vary setting values of the mode variation apparatus, and to set an operating point of the mode variation apparatus based on a quantity of measurement data of the detected microwave leakage radiation resulting from a variation.

12 Claims, 6 Drawing Sheets

(51) Int. Cl.
*H05B 6/72* (2006.01)
*H05B 6/74* (2006.01)

(58) Field of Classification Search
USPC ....... 219/702, 748, 749, 750, 678, 679, 686, 219/690, 695, 696
See application file for complete search history.

(56) References Cited

U.S. PATENT DOCUMENTS

| | | | | |
|---|---|---|---|---|
| 5,365,391 | A * | 11/1994 | Sugiyama | G01R 33/02 360/110 |
| 6,462,320 | B1 | 10/2002 | Fuls | |
| 7,145,118 | B1 | 12/2006 | Wu | |

* cited by examiner

HOUSEHOLD MICROWAVE APPLIANCE HAVING MODE VARIATION APPARATUS

CROSS-REFERENCES TO RELATED APPLICATIONS

This application is the U.S. National Stage of International Application No. PCT/EP2020/069062, filed Jul. 7, 2020, which designated the United States and has been published as International Publication No. WO 2021/005030 A1 and which claims the priority of German Patent Application, Serial No. 10 2019 210 119.4, filed Jul. 9, 2019, pursuant to 35 U.S.C. 119(a)-(d).

The contents of International Application No. PCT/EP2020/069062 and German Patent Application, Serial No. 10 2019 210 119.4 are incorporated herein by reference in their entireties as if fully set forth herein.

BACKGROUND OF THE INVENTION

The invention relates to a household microwave appliance, having a cooking chamber to which microwaves can be applied, at least one mode variation apparatus, which is designed to modify a field distribution of the microwaves in the cooking chamber, and at least one microwave leakage sensor for detecting microwave leakage radiation exiting from the cooking chamber, wherein the household microwave appliance is designed to vary setting values of the at least one mode variation apparatus. The invention also relates to a method for operating a household microwave appliance, wherein microwaves are applied to a cooking chamber and setting values of at least one mode variation apparatus, which is designed to modify a field distribution of the microwaves in the cooking chamber, are varied. The invention can in particular be applied advantageously to standalone microwave appliances and to combination appliances such as an oven with additional microwave function.

It is known for microwave household appliances to measure microwave leakage radiation exiting from a cooking chamber in order to protect a user. The field strengths of the microwave radiation here are measured within the appliance housing or at a door that closes the cooking chamber and checked for compliance with a limit value. If this limit value is exceeded, an appliance malfunction can be assumed and operation of the microwave household appliance is stopped for safety reasons.

EP 2 148 553 A1 for example discloses a method for detecting the microwave leakage radiation by means of a microwave sensor apparatus arranged between a cooking chamber wall and a housing. A time profile of the detected microwave leakage radiation is stored for a time interval by a storage facility which is connected to the microwave sensor facility and is checked for values above the threshold value. It is also described how one or more microwave sensors are placed in regions of openings in the cooking chamber wall.

EP 2 152 047 A1 discloses a safety facility for detecting leakage radiation in a cooking appliance with microwave function and a cooking appliance with such a safety facility. The safety facility comprises at least one microwave sensor which comprises a probe, in which an alternating current can be induced by leakage radiation, or which is suitable for tapping alternating currents that are induced in other objects by leakage radiation. The sensor also comprises a fuse through which the alternating current is passed. Finally the safety facility comprises a facility which is suitable for switching off a microwave source of the cooking appliance as soon as the fuse trips.

DE 2 029 559 A1 discloses a safety device to prevent the escape of radiation from microwave appliances, with at least one gas tube that reacts to microwaves being used, which is arranged in proximity to the zone of a possible radiation escape and integrated electrically into the control circuit of a controlled semiconductor diode, which in turn is in the feed circuit of a relay, the excitation of which causes the electrical feed circuit of a microwave generator to open.

DE 195 37 755 A1 discloses a microwave oven, in particular for a laboratory, with a heating chamber enclosed by a housing, into which microwaves can be coupled and which is accessible through a closable access opening, a microwave sensor being arranged in the region of a gap in the housing leading out from the heating chamber so that when microwave radiation exceeding a certain value enters and/or passes through the gap, the sensor activates the emission of a warning signal or switches off the microwave supply to the heating chamber.

It is also known that a cooking chamber can be viewed approximately as a cavity resonator. There is therefore a finite number of microwave field distributions determined by the geometry of the cooking chamber (which can also be referred to as "modes" or "mode patterns"). Typical microwave field distributions are spatially inhomogeneous and have one or more subregions with increased microwave power or energy (so-called "hot spots"). The transition from one mode pattern to another is typically not continuous but largely discrete.

To measure the field distribution of microwaves in a cooking chamber of a microwave household appliance, intrusive methods have been used up to now in which microwave fields are measured directly in the cooking chamber. This can either be by a direct electrical route by means of receive antennas or by evaluating a change (e.g. heating) in introduced indicator objects. For example US 2008/0302958 A1 discloses an indicator object in the form of a so-called "light board" with a plurality of light sources which are arranged in a distributed manner and can be excited to light up by microwaves. In each instance however an object (sensor, indicator object) is introduced into the interior of the cooking chamber for this purpose.

In today's microwave household appliances a rotary antenna, by way of which microwaves are radiated into the cooking chamber, or a mode stirrer with a fixed angular speed is frequently rotated to equalize the microwave field distribution in an item to be heated over time and thus to avoid static hotspots in the item. This results in an angle-dependent change in the microwave field distribution in the cooking chamber. In the case of microwave generation by a magnetron, the rotation of a rotary antenna can also change the operating frequency of the magnetron due to what is known as "load pulling", which can generally also lead to a drastic change in the mode pattern. Additionally or alternatively a turntable on which the item to be heated is placed, can be rotated at a fixed angular speed.

FIG. 7 shows schematically a dependency of a microwave field distribution or a mode pattern on an angular position or a rotation angle $\varphi$ of a rotary antenna in degrees for a correspondingly equipped microwave household appliance. In this example the rotary antenna in the rotation range of $\varphi$=[0°; 150°] will produce a mode pattern #1 in the cooking chamber. This is the equivalent to the distribution of the microwave radiation and thus the heat distribution in many items remaining practically unchanged in the time segment required to pass through this angle range. A further mode pattern #2 occurs in the angle range φ=[150°; 190°]. A mode pattern #3 is present for a comparatively short portion of one rotation of the rotary antenna, only being present in the range φ=[190°; 205°], etc. This makes it clear that several different mode patterns—and associated heating patterns in the item being cooked—are present during one antenna rotation. These do not necessarily occur equidistantly with regard to the rotation angle of the rotary antenna, which significantly increases the risk of hotspots forming in the item being cooked, as the heat distribution then generated acts on the item being cooked for a disproportionately long time for certain angle ranges.

BRIEF SUMMARY OF THE INVENTION

It is the object of the present invention to overcome the disadvantages of the prior art at least partially and in particular to provide an improved possibility for heating the item being cooked by means of microwaves.

This object is achieved according to the features of the independent claims. Advantageous embodiments are set out in the dependent claims, the description and the drawings.

The object is achieved by a household microwave appliance, having a cooking chamber to which microwaves can be applied, at least one mode variation apparatus which is designed or provided to modify a field distribution of the microwaves in the cooking chamber, and at least one microwave leakage sensor for detecting microwave leakage radiation exiting from the cooking chamber, the household microwave appliance being designed to vary setting values of the at least one mode variation apparatus and, based on the quantity of measurement data of the detected microwave leakage radiation resulting from the variation, to set at least one operating point of the at least one mode variation apparatus.

This household microwave appliance advantageously makes it possible to determine, by means of a cost-effective structure and within a very short time, which setting values of the at least one mode variation apparatus are associated with the same or practically the same microwave field distributions or mode patterns. Analogously it is possible to systematically determine the setting parameters associated with all possible mode patterns. As a result the total available basic quantity of setting values of the at least one mode variation apparatus can advantageously be reduced to a significantly smaller sub-quantity of operating points for their actual activation, with the operating points being able to be selected in particular in such a way that each operating point results in or is associated with a different mode pattern. This in turn makes it possible to avoid temporal inequalities in a particularly simple manner when generating different mode patterns. There is also the advantage that the assignment of mode patterns to setting values can be performed for an empty cooking chamber as well as for basically any load present in the cooking chamber. The assignment of mode patterns to setting values is therefore tailored to an actual load in the cooking chamber. There is no need to wait for a reaction (for example a temperature rise that can be measured by means of a thermal camera) in the item to which the microwaves are to be applied, allowing particularly rapid assignment. In addition no microwave sensors or indicator objects have to be arranged in the cooking chamber, allowing a particularly inexpensive and simple structure. The underlying idea can also be seen as being that a conclusion can be drawn about the corresponding mode pattern in the cooking chamber by measuring microwave leakage radiation as a function of settings that modify the field pattern in the cooking chamber. This in turn allows operating parameters to be tailored in order to operate the microwave appliance in an improved manner. In other words operating parameters, in particular operating points, of an operating sequence of a household microwave appliance can be tailored as a function of a measurement of a change in leakage radiation.

The household microwave appliance has a cooking chamber with a loading opening, typically at the front, which can be closed by means of a microwave-tight door. The household microwave appliance also has a microwave generator such as a magnetron or a semiconductor-based microwave generator. The microwave generator is advantageously inverter-controlled. The microwaves generated by the microwave generator can be coupled into the cooking chamber, e.g. directly or by way of a wave guide. In one development the household microwave appliance has a rotary antenna for coupling the microwaves into the cooking chamber.

The household microwave appliance can be a standalone microwave appliance, the energy of which is only provided by the microwaves for treating items present in the cooking chamber. The household microwave appliance can however also be a combination appliance which, in addition to the microwave generator, has at least one further energy source for treating the item present in the cooking chamber, e.g. a heat source such as at least one resistance heating element. The combination appliance can be for example an oven with additional microwave functionality or a microwave appliance with an additional oven function.

The cooking chamber is delimited by a cooking chamber wall, which can have leakage openings such as feed-through openings, e.g. for cables, the rotary antenna, etc., through which the microwave leakage radiation can exit through the cooking chamber wall into the appliance. "Microwave leakage radiation" here refers to microwave radiation exiting from the cooking chamber in particular when the cooking chamber door is closed.

A mode variation apparatus can refer in particular to an apparatus that can be set at the appliance and which is suitable or provided for bringing about markedly different field distributions of the microwaves in the cooking chamber as a function of its setting values. Two or more setting values thus result in two or more different microwave field distributions. The microwave field distribution in the cooking chamber can therefore be modified by changing the setting values. It is also possible here for two or more different setting values to result in the same or practically the same microwave field distributions or mode patterns. In individual instances, depending for example on the type of load in the cooking chamber, it is also possible for all setting values of at least one mode variation apparatus to result in the same or practically the same microwave field distributions.

The type of the at least one microwave leakage sensor is in principle not restricted. There can therefore also be several leakage sensors present that are of a different or the same type (e.g. detection method). If there are several leakage sensors, spatially resolved detection of the microwave leakage radiation is possible. However only the strength of the microwave leakage radiation exiting as a whole can be determined to determine the switching points.

If there are several mode variation apparatuses present and/or if the setting values of several setting parameters can be varied in one mode variation apparatus, the setting values of the at least one mode variation apparatus can be varied, for example by setting all possible combinations of the setting values of all setting parameters. Measurement data can then correspond to multi-dimensional tuples of setting values for different setting parameters.

An "operating point" can refer in particular to a specific value or, in the multi-dimensional instance, to a specific value tuple of the at least one mode variation apparatus, to which the at least one mode variation apparatus can be specifically set or is set in order to operate the household microwave appliance.

In one embodiment, to determine the switching points, the household microwave appliance is designed:

- to pass through a setting range of at least one mode variation apparatus;
- to measure a strength of the microwave leakage radiation for the respective set values ("setting values") of the setting range passed through; and
- to determine at least one characteristic property from the resulting curve profile, from which the at least one operating point can be set.

In this way the operating points can advantageously be determined particularly robustly and quickly. Passage through a setting range includes in particular setting several setting values in succession, in particular all setting values, of a possible or predetermined value range of at least one setting parameter, which is referred to as the "setting range". Characteristic properties refer in particular to points or regions of the measured curve from which the operating points can be determined particularly clearly or reliably.

In one development a change in a mode pattern can be determined or ascertained based on at least one characteristic property; in other words such a point correlates with a change in a mode pattern.

In one development maintenance of a mode pattern can be determined or ascertained based on at least one characteristic property; in other words such a point correlates with a stable mode pattern.

Characteristic properties can occur at points or regions of the curve profile where there is a particularly marked change in the measured microwave strength. However this is not necessarily so and characteristic properties that are indicative of a change in the mode pattern can for example also be derived from a wide curve range (for example an angle range of 100° or greater). It is thus possible for a continuous transition to take place between different mode patterns while passing through a setting range of at least one mode variation facility. This is then characterized for example by an extended flank with an almost constant gradient in the curve profile.

In one embodiment the at least one characteristic property comprises the presence of switching points, at which a significant modification of the field distribution occurs, and the household microwave appliance is designed to set operating points of the at least one mode variation apparatus so that they lie outside the switching points. This ensures that different mode patterns are reliably generated.

That a significant or marked modification of the field distribution occurs can in particular mean that there is a change between different mode patterns at or in the region of a switching point. However a mode pattern remains at least largely the same between two adjacent switching points, e.g. with regard to the number and spatial location of hotspots. Fluctuations in a mode pattern between adjacent switching points can then comprise for example modifications of the relative field strength and/or expansion of the hotspots. The switching values are therefore setting values of the at least one mode variation apparatus, at which a marked modification of the field distribution occurs, in particular a rapid change between two mode patterns.

That an operating point lies outside the switching points means in particular that there is a sufficient value difference between the operating point on the one hand and the nearest or adjacent switching points (e.g. a next smallest switching point and a next largest switching point).

This advantage is achieved particularly reliably by the embodiment wherein the operating points are located centrally between adjacent switching points.

In one embodiment the switching points are determined from turning points of the curve. This can be done in particular so that the turning points associated with the switching points are determined from extreme points of a first derivation of the curve of the measurement values.

In an alternative or additional embodiment the characteristic properties comprise extreme and/or terrace points of the curve and the household microwave appliance is designed to set the extreme and/or terrace points as operating points of the at least one mode variation apparatus. This has the advantage that the operating points can be determined directly from points on the curve or derivations thereof and not indirectly from a relationship with switching points.

Characteristic properties of the curve of the curve, such as switching points for example, can generally be determined with the aid of standard curve evaluations or curve discussion. Characteristic points can thus be determined as zeros, zeros of a gradient, maxima/minima, maxima/minima of a gradient, turning points, terrace points, etc. of the measurement curve or any derivations.

In one embodiment, the household microwave appliance is designed to determine the operating points again at the start of each microwave operating sequence, e.g. a microwave cooking sequence. This determination can also be referred to as an "initial scan". This allows a particularly precise and reliable determination of the operating points to be achieved. An initial scan typically only takes a few seconds.

Alternatively the operating points can be performed once for respective operating sequences and/or cooking parameters such as a type of item to be cooked (e.g. pizza) etc. and then stored and later retrieved from a data storage unit for the same or similar operating sequences and/or cooking parameters. This has the advantage that there is no need for an initial determination of the operating points in many instances. In one development the operating points are only determined every nth time for the same or similar operating sequences and/or cooking parameters. This has the advantage that changes in the assignment of mode patterns to setting values can be taken into account.

In one development just one operating point is set for a specific mode pattern; in other words no more than one operating point is set for each mode pattern. In one development no operating point is set for at least one mode pattern, for example because adjacent switching points are too close to one another.

In one development the household microwave appliance is designed to set the operating points during a microwave operating sequence with the same time ratios. This allows a particularly uniform microwave field distribution to be achieved over the duration of the microwave operating sequence. This development can be implemented for example by setting the desired operating points cyclically one after the other and holding them for the same period of time.

In one embodiment the at least one mode variation apparatus has or is at least one apparatus from the group of rotary antenna, mode stirrer, turntable and/or microwave generator. These apparatuses have the advantage that their adjustment can result in a particularly marked modification of the field distribution. At least the turntable, the rotary antenna and the (rotatable) mode stirrer are even specifically intended to modify the field distribution, typically by changing their rotational or angular position.

The rotary antenna, the mode stirrer and the turntable in particular have at least one rotation angle φ that can be adjusted within a rotation angle range as a mode-influencing setting parameter. The rotation angle φ can be adjusted continuously or in steps (for example in increments of $\Delta\varphi=1°$, 5° or 10°) within the rotation angle range. The usable rotation angle range can be for example [0°; 180°] or [0°; 360°]. The rotary antenna can in particular be continuously rotatable. However, depending on configuration, the rotary antenna and/or the mode stirrer can also provide other mode-influencing setting parameters such as their height position along their rotation axis and/or a relative angular position of two wings or blades to one another about a rotation axis of the rotary antenna.

The microwave generator, in particular if it is in the form of a semiconductor-based microwave generator, in particular has the microwave frequency of the microwaves generated by it as a mode-influencing setting parameter. The microwave frequency can be adjustable continuously or in steps (for example in increments of $\Delta f=0.01$ GHz or 10 MHz, 5 MHz or 1 MHz) for example in a range f=[2.4 GHz; 2.5 GHz]. If more than one feed point for microwaves is used in the cooking chamber, the phase shift between the feed paths can also be used as a setting parameter.

In principle, leakage radiation can be measured at any point when the door is closed. In one embodiment the at least one microwave leakage sensor is designed to measure microwave leakage radiation passing through a cooking chamber wall. In an additional or alternative embodiment the at least one microwave leakage sensor is designed to measure microwave leakage radiation passing through a door gap between a housing flange and a door that closes the cooking chamber.

In one embodiment, the at least one microwave leakage sensor comprises or has at least one sniffer line that is laid or is present outside the cooking chamber. A "sniffer line" refers to an electrically conductive, in particular metallic, line (e.g. a conductor track, wire, cable, etc.) into which electrical currents can be induced by microwaves. At least one sniffer line is connected to an evaluation circuit of the microwave leakage sensor, the evaluation circuit being configured for the quantitative measurement of a variable of alternating currents induced in the at least one sniffer line connected thereto. The sniffer line can advantageously have a significant length and can be laid in multiple ways in the household microwave appliance. This in turn has the advantage that large regions of the household microwave appliance outside the cooking chamber can be monitored for microwave leakage with one sniffer line, allowing the number of microwave leakage sensors to be reduced compared with microwave sensors that only measure point by point. In particular electrical currents from different leakage points can be induced in a sniffer line at the same time, so that the sniffer line acts in a position-integrating manner. It has been shown that the switching points can advantageously also be determined with a high level of accuracy in such an instance.

In one development a sniffer line can be used, which passes all the selected leakage points. This has the advantage that the switching points can be determined using just a single sniffer line.

A further advantage of the sniffer line is that the evaluation circuit can be arranged remotely from sources of leakage radiation in regions of the household microwave appliance that are subject to little thermal, chemical and/or electromagnetic stress. In contrast the sniffer lines, are significantly more resistant and can also pass through thermally and chemically stressed (e.g. hot and/or moist) regions without any problems.

The evaluation circuit is designed in particular to determine the strength of a microwave-induced current induced in the at least one sniffer line, which is a measure of the strength of the leakage or leakage rate. The evaluation circuit can have one or more electrical and/or electronic components and/or functional units such as capacitors, resistors, processors (e.g. microcontrollers, ASICs, FPGAs), rectifiers, A/D converters, etc.

In one development an evaluation circuit can be connected to just one sniffer line and can therefore only evaluate said sniffer line or determine the strength of a microwave-induced current in said sniffer line. In an alternative development an evaluation circuit is connected to several sniffer lines. In this instance several sniffer lines can be evaluated jointly by the evaluation circuit. The joint evaluation enables a particularly simple and inexpensive detection facility to be provided. The covered or detectable detection area can also be enlarged as a result, so that the evaluation unit can respond more quickly when the mode is switched. In one development several sniffer lines can be brought together electrically for this purpose and connected to the evaluation circuit at a common node point. Alternatively several sniffer lines can be evaluated individually using the same evaluation circuit, e.g. at different times or in parallel. The individual evaluation allows improved localization of a mode change. Alternatively the household microwave appliance can have several evaluation circuits, each connected to a sniffer line for example. These can be arranged so that they are distributed over the household microwave appliance.

In one development at least one sniffer line has or performs at least one further function, at least partially. In particular an electrical line that is already present for a different purpose can also be used as a sniffer line. A line having the at least one further function would therefore be present in the appliance even if it were not used to detect the microwave leakage. This has the advantage that no separate electrical line is required for this sniffer line to detect microwave leakage. This in turn advantageously allows a particularly cost-effective structure.

In one development the at least one further function comprises a power supply function for supplying at least one electrical consumer of the household microwave appliance with electrical energy and/or a data transmission function. In other words at least one sniffer line is also a power supply line for at least one electrical consumer and/or a data transmission line. The ("load") current used to operate the consumer can be a direct current or an alternating current. Such sniffer lines have the advantage that they are typically configured identically over their length and/or have a defined, particularly low electrical resistance. This in turn allows particularly precise and reliable identification or evaluation of the alternating currents induced therein by microwaves. A further advantage is that such sniffer lines typically connect functional units to one another, which are located in spatial regions of the household microwave appliance that are exposed to little thermal and/or chemical and/or electromagnetic stress. Consequently the evaluation circuit can also be arranged on end segments of the sniffer lines in said regions with little or no adaptation outlay.

However it is in principle also possible to use other electrically conductive components of the household microwave appliance that fulfill a mechanical function for example as sniffer lines, in particular elongated components such as struts, fastening wires etc. In this instance it may be necessary to extend the components with additional line segments in the form for example of wires to the evaluation circuit so that the evaluation circuit can be housed in a spatial region with little thermal and/or chemical stress and/or to allow an electrical connection to the evaluation circuit. The additional line segments can be soldered to the electrically conductive components for example.

In one development the at least one electrical consumer comprises a heating element, a light generating facility, a motor, a power supply facility and/or electronics (for example a control board) etc. The heating element can be for example a resistance heating element for heating the cooking chamber or an evaporator. The light generating facility can be or have for example a lamp or other illuminating device, for example for illuminating the cooking chamber, operating elements or decorative elements. The motor can be for example a motor for moving a rotary antenna, a roasting spit, a fan, a flap (for example a vapor flap), a turntable, a cooking chamber door, a pump, etc. In principle however the at least one electrical consumer is not restricted to this and can be any other consumer such as a control panel or component thereof, a camera, a communication module (for example a WLAN or Ethernet module), etc.

In one embodiment at least one sniffer line has at least one data transmission function and is connected to at least one functional unit of the appliance that is not an electrical consumer, for example a sensor, a reed contact or other magnetic switch, etc. This is the case for example if the functional unit that does not consume electricity is a sensor, for example a temperature sensor, specifically a temperature probe. However there are also sensors that are electrical consumers, for example oxygen sensors in the form of lambda probes that have a heating element. If the functional unit that is not an electrical consumer is a reed contact, in one variant this might only switch signal levels (with a microcontroller for example evaluating the switching status), in another variant for example an excitation current of a relay coil. The cabling of both reed contacts would be suitable sniffer lines.

An electrical line can also be designed or used as a sniffer line, serving both for power supply and for data transmission, for example by modulating a power supply signal with a data signal. In principle an electrical consumer can be connected both to a dedicated power supply line and to a dedicated data line, one or more of which can serve as a sniffer line.

In one development at least one sniffer line has at least one segment, the shape and/or position of which is determined (only) by the function of the sniffer line for the detection of microwave leakage radiation. This segment therefore does not contribute to the performance of the further function of the sniffer line or can even have a (typically only slightly) negative effect on it. The advantage of such a segment is that it is shaped and/or laid for the improved detection of microwave leakage radiation and therefore allows its particularly reliable detection. The segment can for example be laid through or around regions of openings in a cooking chamber wall. The increased length increases its ohmic resistance but this need only have a negligibly small or practically no effect on its power line and/or data transmission function. The segment can also be convoluted (for example meandering).

In one development at least one sniffer line has a length of at least 800 mm, in particular at least 1000 mm, in particular at least 1500 mm, in particular at least 2000 mm. Such a long length has the advantage that as many/large regions as possible within the housing of the household microwave appliance can be covered with one sniffer line and locally distributed sources of leakage radiation can be sensed or detected with a small number of sniffer lines.

However it is also possible for the microwave detection device to have at least one sniffer line which has no further signal-conducting (i.e. no current and/or data-conducting) function, in particular has no further function. Such a sniffer line is therefore only laid for the purpose of detecting microwave-based induction. Provision of a sniffer line has the advantage that it can be laid in the appliance in a particularly variable manner, e.g. because it is functionally connected to the evaluation circuit at one end but the other end is a freely positionable end. Such a sniffer line can be for example a wire, a cable, a conductor track applied to a substrate, etc. The household microwave appliance can therefore be configured such that the evaluation circuit is connected to at least one sniffer line, which also fulfills at least one further function, and/or to at least one sniffer line without a dedicated further function.

In one development at least one evaluation circuit is an independent component of the household microwave appliance, is arranged separately from a control facility and is connected to the control facility by way of at least one signal line. This has the advantage that at least one evaluation circuit can be positioned particularly flexibly in the household microwave appliance. The evaluation circuit can in particular supply information about the strength of the microwave-induced alternating current as an output signal or output information. The output signal or output information can be in analog or digital form. The output signal or output information can be used by the control facility to assess whether at least one action associated with the strength of the leakage rate should be triggered, as described in more detail below.

In one embodiment the evaluation circuit is integrated in a control facility of the household microwave appliance. This has the advantage that the evaluation circuit is housed in a spatial region which is particularly well suited or provided for housing electrical and/or electronic components. This is particularly advantageous if the control facility is housed in a specially protected casing, section or compartment that is for example thermally insulated and/or ventilated to cool the evaluation unit. A further advantage is that the signal paths between evaluation circuit and control facility are particularly short and therefore not susceptible to interference. In particular the output signals or output information can be routed directly to a processor (e.g. a microcontroller, FPGA, ASIC, etc.) of the control facility. Another advantage is that typically several electrical lines (power supply lines and/or data lines) run to consumers from the control facility, so that the positioning of the evaluation circuit on the control facility allows particularly short paths from the at least one sniffer line to the evaluation circuit.

In one development the evaluation circuit is integrated in the control facility of the household microwave appliance in such a manner that it is an independent structural unit (e.g. has its own plate or circuit board) that is fastened to the circuit board or plate of the control facility, for example by means of soldered connection(s), a slot, etc.

In one development the evaluation circuit is integrated in the control facility of the household microwave appliance in such a manner that the components of the evaluation circuit are plugged into a circuit board of the control facility.

In one development the evaluation circuit is functionally integrated in the control facility to such a degree that a processor of the control facility also takes over the evaluation of the sniffer line(s). There is then advantageously no longer any need for a separate or separately manufactured evaluation circuit.

In one embodiment the evaluation circuit is connected to the at least one sniffer line by way of at least one conductor track on a circuit board of the control facility. This allows particularly simple, space-saving and robust connection of the evaluation circuit to the at least one conductor track. A sniffer line is passed in particular to the plate and connected there to the conductor track, for example by soldering points, terminals, plugs, etc.

In one embodiment the evaluation circuit is connected to the at least one sniffer line by way of a coupling capacitor. This has the advantage that the sniffer line is galvanically isolated from the evaluation circuit, but alternating current signals can be transmitted through the coupling capacitor. The coupling capacitor thus establishes a direct current voltage separation between sniffer line and evaluation circuit. In particular one connection of the coupling capacitor is connected electrically to at least one sniffer line and the other connection is connected electrically to the evaluation circuit. The coupling capacitor can also be part of the evaluation circuit.

In one embodiment the coupling capacitor is a component of a high-pass filter. This has the advantage that the comparatively high-frequency microwave-induced alternating currents (which can have for example a frequency in the range of the microwave frequency) are allowed to pass through to the evaluation circuit, while low-frequency alternating currents, such as those typically used for supplying a consumer with alternating current (for example with a network frequency of 50 Hz) cannot pass through. This prevents the measurement signal of the microwave leakage radiation being affected by electrical currents in the sniffer lines with lower frequencies, which in turn increases the accuracy of the evaluation.

In one development the coupling capacitor together with an in particular grounded ohmic resistor forms the high-pass filter. The resistor can be a component of the evaluation circuit, for example its input resistor.

In one embodiment the high-pass filter additionally has a resistor connected to the coupling capacitor, in particular an input resistor, and the coupling capacitor has a capacitance of magnitude C (equation 1):

$$C = \frac{1}{2 \cdot \pi \cdot R \cdot f_u}$$

where R is the resistance value of the ohmic resistor and $f_u$ is a lower limit frequency of the high-pass filter.

This formula results from a complex transmission function $\underline{T}$, which shows the ratio of a voltage $\underline{U}_2$ passed on by the high-pass filter to the voltage $\underline{U}_1$ present on the monitored or tapped sniffer line (eq. 2):

$$\underline{T} = \frac{\underline{U_2}}{\underline{U_1}} = \frac{1}{1 - \frac{i}{2\pi \cdot f \cdot R \cdot C}}$$

Since only the magnitude of the transmission function (and not its phase position) is of interest here, it follows that (eq. 3):

$$|\underline{T}| = \frac{|\underline{U_2}|}{|\underline{U_1}|} = \frac{1}{\sqrt{1 + \frac{1}{(2\pi \cdot f \cdot R \cdot C)^2}}}$$

For the selection and dimensioning of the coupling capacitor C it was assumed that a lower limit frequency $f_u$ of the resulting high pass is as high as the signal to be measured requires as a minimum (the measurement signal has a typical microwave frequency of 915 MHz or 2.45 GHz). The lower limit frequency $f_u$ is set so that the transmitted voltage $\underline{U}_2$ is only $1/\sqrt{2}$ or approx. 70.7% of the amplitude of the original signal $\underline{U}_1$ or the original signal $\underline{U}_1$ is weakened by this factor. It follows from this for the magnitude of the transmission function $$|\underline{T}| = \frac{1}{\sqrt{2}} = \frac{1}{\sqrt{1 + \frac{1}{(2\pi \cdot f \cdot R \cdot C)^2}}}$$

This gives the advantageous magnitude of the capacitance value C of the coupling capacitor according to eq. 1.

The output or calculation values determined by the evaluation circuit, which are a measure of the strength of the microwave leakage, can be used for example by the control facility or another data processing device to determine the switching and operating points.

The microwave leakage radiation can also generally be measured indirectly, for example by quantifying secondary effects in frequency ranges different from the microwave frequency, e.g. at typical frequencies of 20 kHz to 100 GHz relevant for EMC (electromagnetic compatibility), which can also be carried on the network line.

The object is also achieved by a method for operating a household microwave appliance wherein microwaves are applied to a cooking chamber, setting values of at least one mode variation apparatus, which is designed to modify a field distribution of the microwaves in the cooking chamber, are varied, the microwave leakage radiation exiting from the cooking chamber is measured for the different setting values of the at least one mode variation apparatus, and operating points of the at least one mode variation apparatus are set based on the detected microwave leakage radiation.

The method can be configured analogously to the household microwave appliance and has the same advantages.

In one embodiment the detected microwave leakage radiation is used to determine switching points at which a marked modification of the field distribution of the microwaves occurs within the cooking chamber. Operating points of the at least one mode variation apparatus are set so that they lie outside the switching points.

To perform the method, the household microwave appliance can have a correspondingly designed, e.g. programmed, data processing device. The data processing device can be functionally integrated in a control facility of the household microwave appliance, i.e. the control facility can be designed to allow the method described above to run.

BRIEF DESCRIPTION OF THE DRAWINGS

The properties, features and advantages of this invention as described above and the manner in which they are achieved will become clearer and more readily understandable in conjunction with the following schematic description of an exemplary embodiment, which is explained in more detail in conjunction with the drawings.

Figure 1:
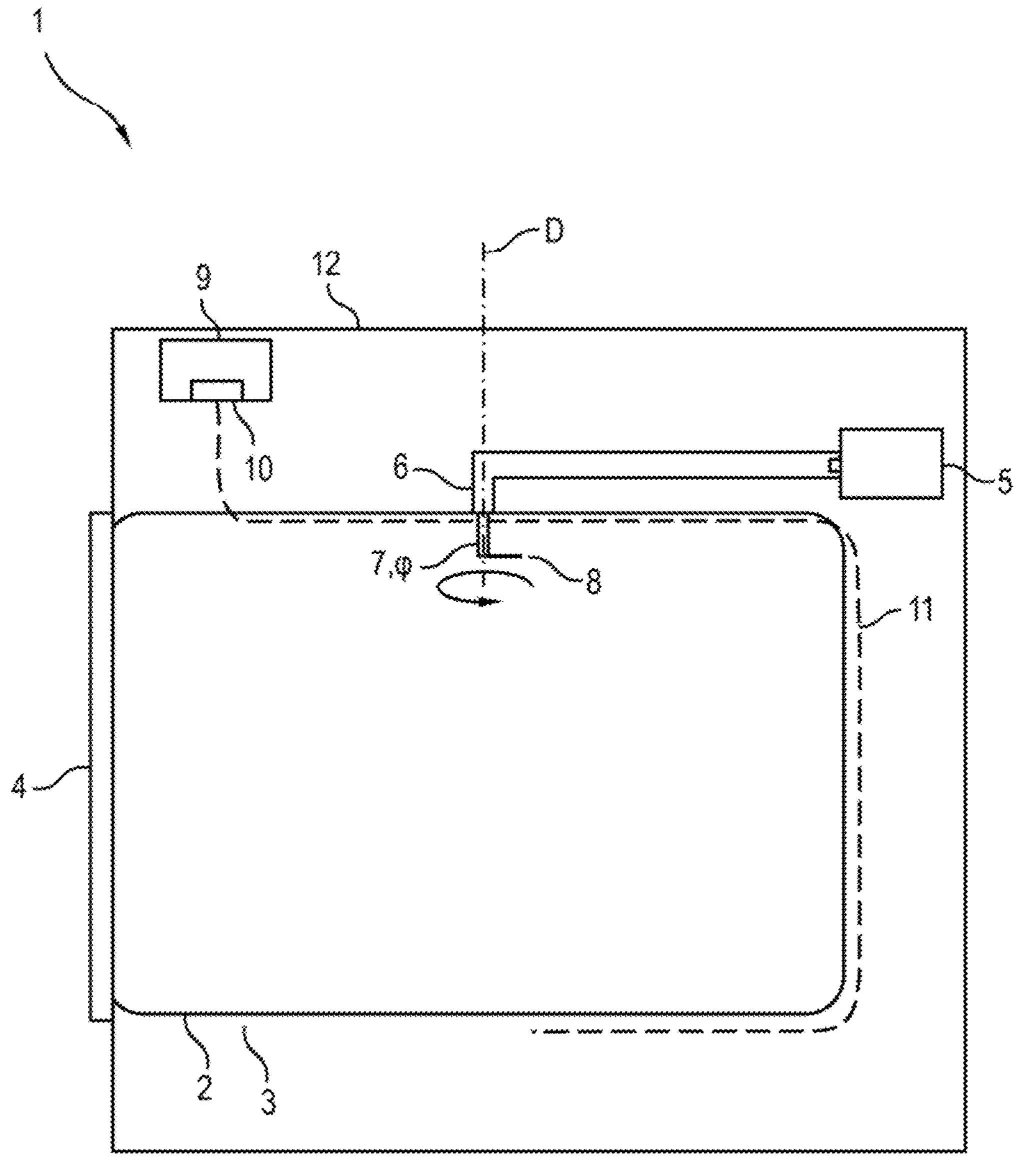
Figure 2:
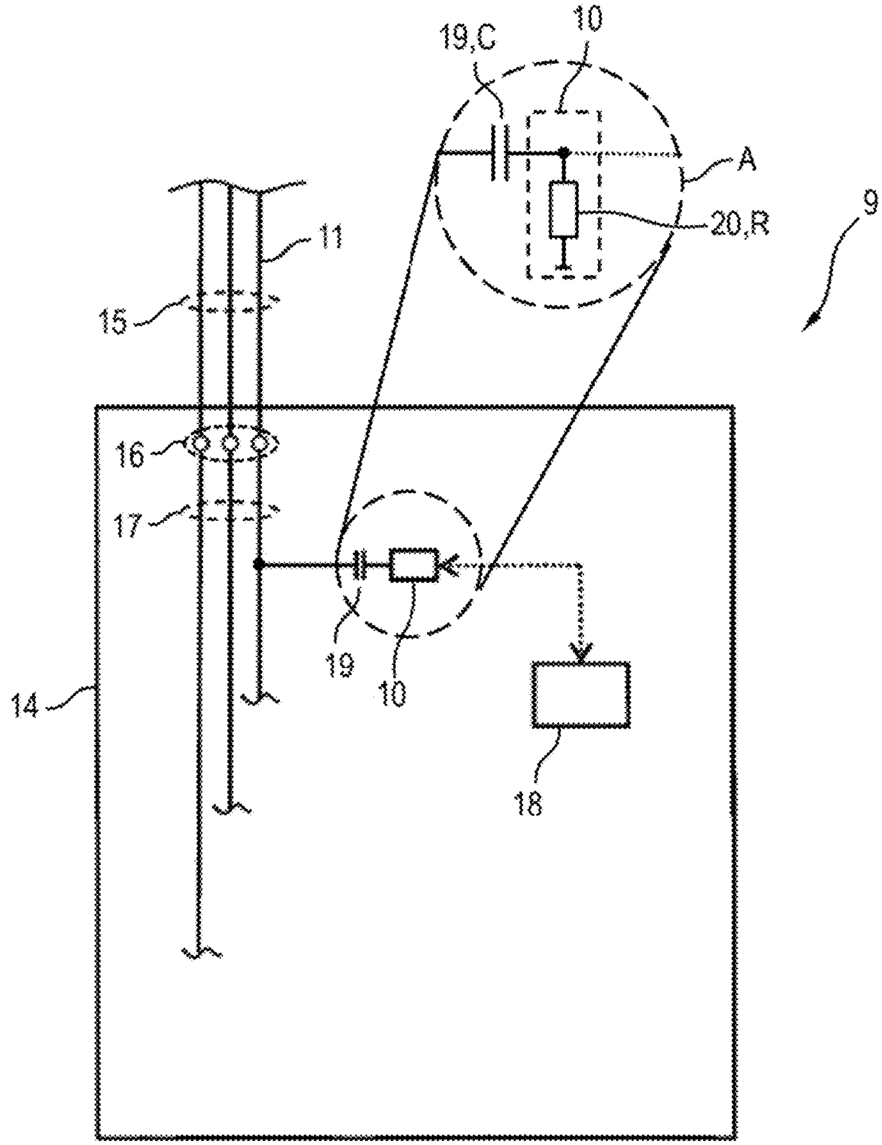
Figure 3:
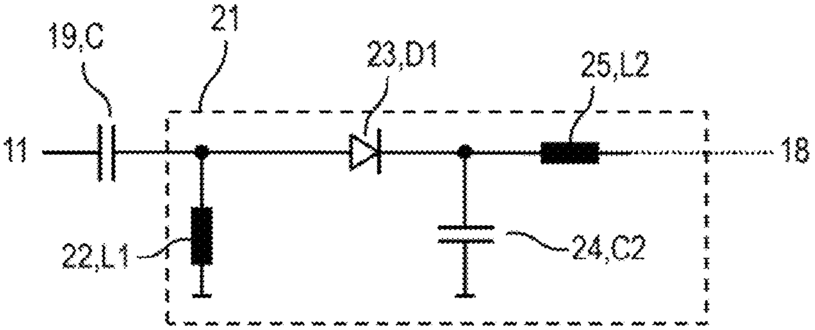
Figure 4:
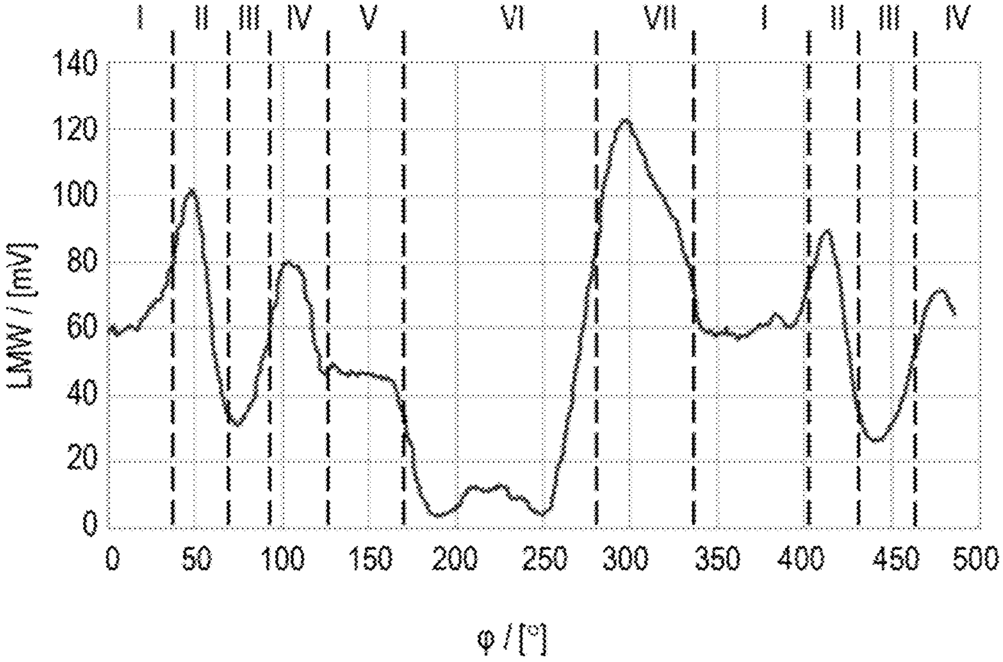
Figure 5:
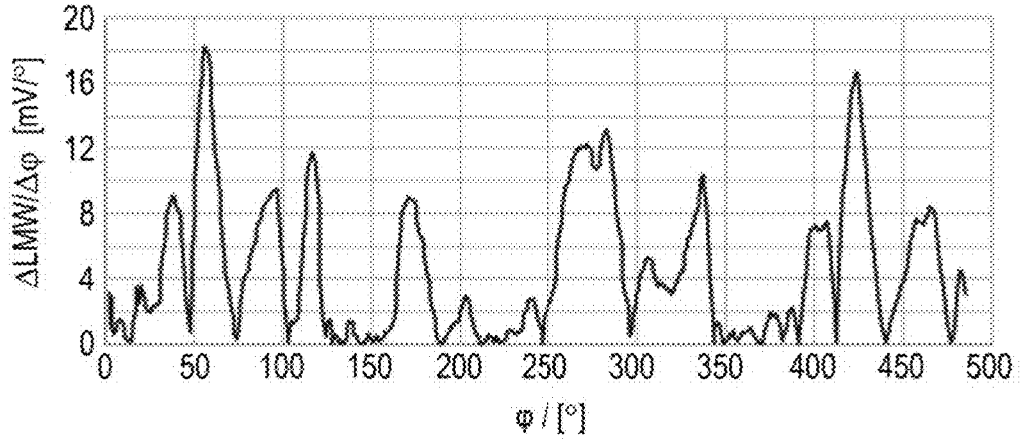
Figure 6:
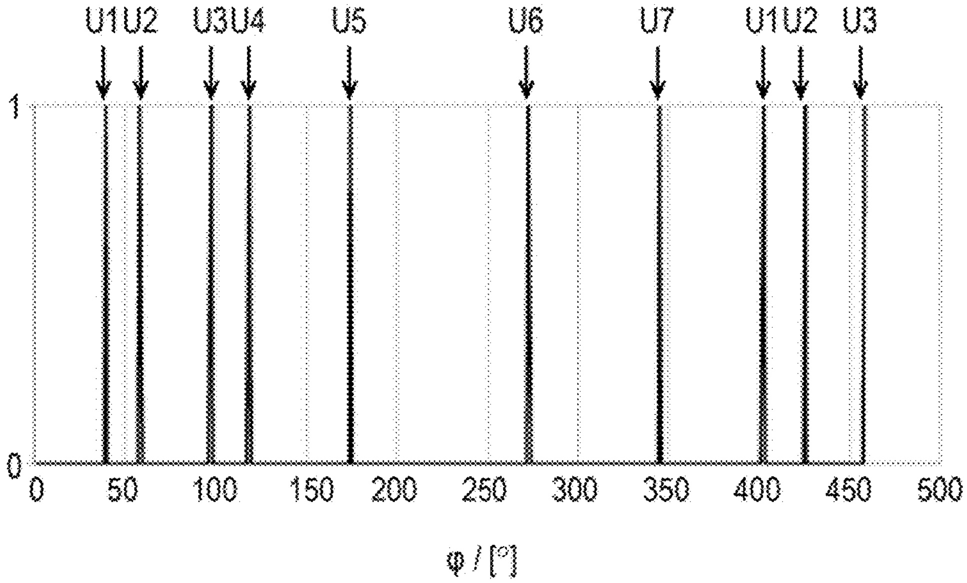
Figure 7:
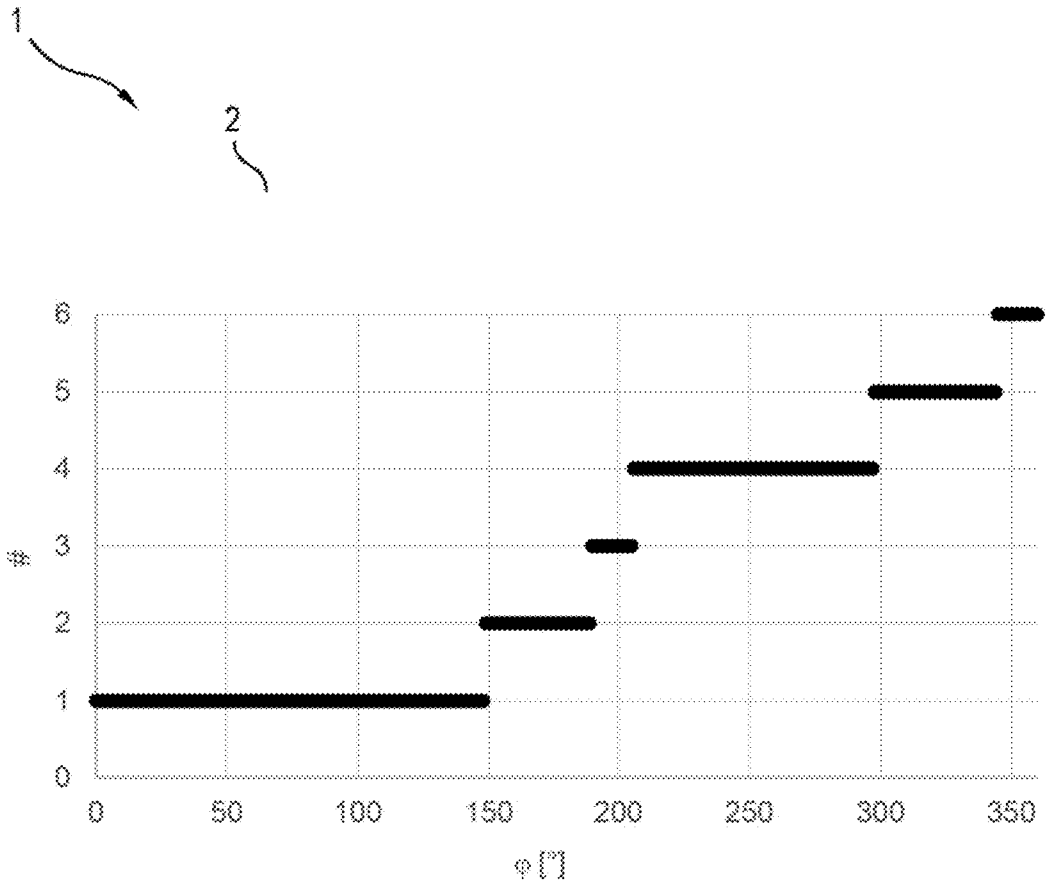
Figure 8:
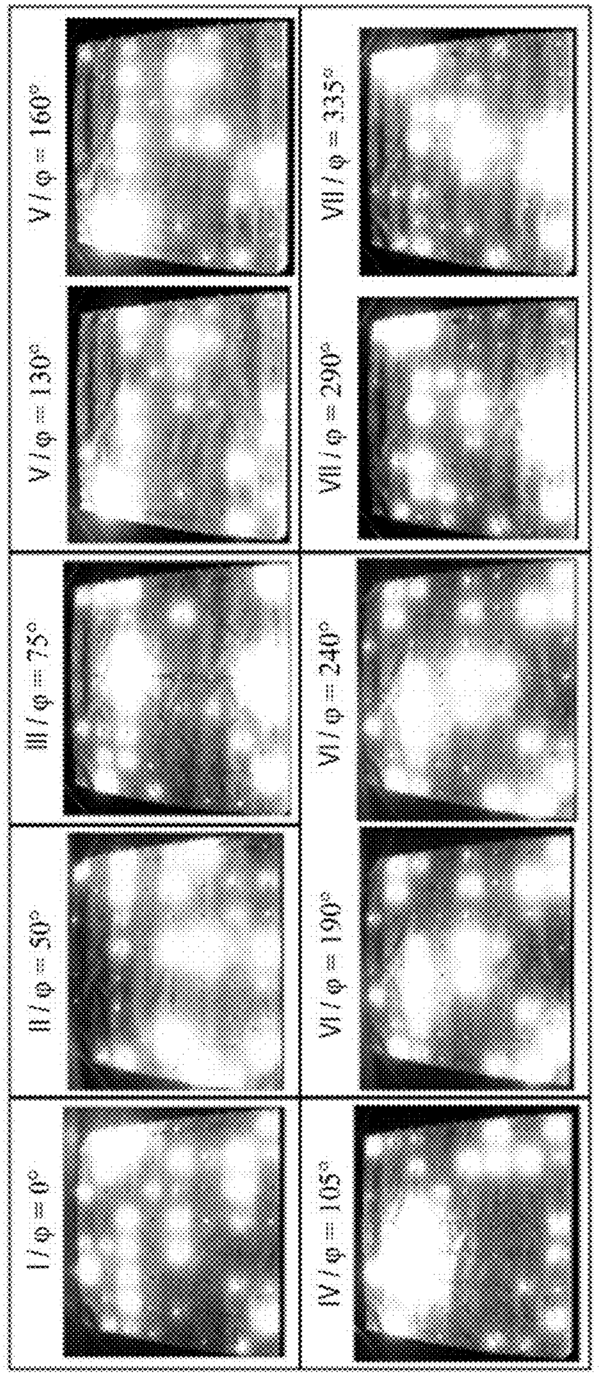

| | |
|---|---|
| FIG. 1 | shows a sectional side view of a household microwave appliance; |
| FIG. 2 | shows a plan view of a control facility of the household microwave appliance from FIG. 1 with an evaluation circuit; |
| FIG. 3 | shows an alternative evaluation circuit for the household microwave appliance from FIG. 1; |
| FIG. 4 | shows a graph of a measurement value measured by the microwave leakage sensor of the household microwave appliance from FIG. 1, which represents a strength of the microwave leakage radiation, against a rotation angle of the rotary antenna of the household microwave appliance from FIG. 1; |
| FIG. 5 | shows a graph of a magnitude of a derivation of the curve determined from FIG. 4 and then smoothed against the rotation angle of the rotary antenna; |
| FIG. 6 | shows a graph of switching points determined from the curve from FIG. 5 against the rotation angle of the rotary antenna; and |
| FIG. 7 | shows schematically a dependency of a microwave field distribution on the rotation angle φ of the rotary antenna for the microwave household appliance from FIG. 1. |
| FIG. 8 | shows a so-called light board as a measurement structure indicating the field distribution in the cooking chamber as a function of the rotation angle φ of the rotary antenna for a microwave household appliance according to FIG. 1. |

DETAILED DESCRIPTION OF EXEMPLARY EMBODIMENTS OF THE PRESENT INVENTION

FIG. 1 shows a sectional side view of an outline of a household microwave appliance 1 with a cooking chamber 2. The cooking chamber 2 is enclosed by a cooking chamber wall or muffle 3, which has a front loading opening that can be closed by a door 4. The household microwave appliance 1 has at least one microwave generator 5 for treating items (not shown) present in the cooking chamber 2, and in some instances also further heating elements such as one or more resistance heating elements (not shown).

The microwaves generated by the microwave generator 5 are conducted to the cooking chamber 2 by way of a microwave guide 6 and coupled there into the cooking chamber 2 by way of a rotary antenna 7 serving as a mode variation apparatus. The rotary antenna 7 here has an antenna wing 8 for example and can be rotated through 360° about a rotation axis D by means of a stepper motor (not shown). The rotary antenna 7 can therefore assume angular positions or rotation angles in a range φ=[0°; 360°], e.g. in steps of Δφ=1° or 5°.

The household microwave appliance 1 or its controllable components including the microwave generator 5 and the rotary antenna 7 can be activated or actuated by means of a central control facility 9 (also referred to as "appliance controller").

An evaluation circuit 10, which is connected to a sniffer line 11, is integrated in the control facility 9. The sniffer line 11 is designed so that alternating currents can be induced in it by microwaves. It is configured for example as a simple wire or cable. The evaluation circuit 10 is configured to determine a strength of alternating currents induced in the sniffer line 11. The evaluation circuit 10 and the sniffer line 11 form a detection device 10, 11 for detecting microwave leakage radiation outside the cooking chamber 2, in particular in an intermediate space between the cooking chamber 2 and an outer housing 12 of the household microwave appliance 1 and/or in the region of the door 4. The sniffer line 11 can have a length of at least 800 mm, in particular at least 1000 mm, in particular at least 1500 mm, in particular at least 2000 mm.

FIG. 2 shows a plan view of an outline of the control facility 9 with some of the components present thereon. Multiple electrical lines 15 are routed to a circuit board 14 of the control facility 9, their other ends being connected to functional units of the household microwave appliance 1 such as electrical consumers and/or sensors and/or sniffer lines. One of the electrical lines 15 here corresponds to the sniffer line 11.

The electrical lines 15 are connected to the circuit board 14 at connection points 16, such as terminals or the like, and transition there into corresponding conductor tracks 17 of the circuit board 14. In the exemplary embodiment shown purely by way of example only one sniffer line 11 is connected to an evaluation circuit 10 arranged on the circuit board 14, which in turn is connected to a processor 18, e.g. a microcontroller, ASIC or FPGA, of the control facility 9. The evaluation circuit 10 is therefore integrated in the control facility 9.

In particular the evaluation circuit 10 is connected here from the conductor track 17 connected to the sniffer line 11 by way of a coupling capacitor 19, which brings about a direct current voltage separation between the evaluation circuit 10 and the sniffer line 11.

As shown in the enlarged detail A, the evaluation circuit 10 has at least one ohmic resistor 20, which is connected on the one hand to the connection connected to the processor 18 and on the other hand to a predetermined reference potential or ground. The coupling capacitor 19 and the resistor 20 form a high-pass filter 19, 20 for the signal arriving from the sniffer line 11.

The coupling capacitor 19 here advantageously has a capacitance value C of magnitude $$C = \frac{1}{2 \cdot \pi \cdot R \cdot f_u}$$

where R is the resistance value of the resistor 20 and $f_u$ a desired lower limit frequency of the high-pass filter 19, 20. The lower limit frequency $f_u$ is selected so that practically only the microwave-induced voltage components are allowed through.

The—e.g. analog—output signal of the evaluation circuit 10 is forwarded to the processor 18 for evaluation (e.g. to an analog input of a microcontroller). However the evaluation circuit 10 can also have other components or parts (not shown), for example an A/D converter, operational amplifier, etc.

The control facility 9 is designed to determine switching points, at which a marked modification of the field distribution occurs in the cooking chamber 2, and corresponding operating points, based on a strength of the microwave-induced alternating current in the sniffer line 11, represented by the output signal of the evaluation circuit 10.

FIG. 3 shows an alternative evaluation circuit 21 to the evaluation circuit 10. The alternative evaluation circuit 10 also has a filter function, but now with an LC filter provided.

Instead of the ohmic resistor 20 shown in FIG. 2, a first coil 22 with an inductance value L1 and an anode side of a diode 23 are now connected to the coupling capacitor 19 by way of a common node point. The other connection of the first coil 22 is connected to ground, while the cathode connection of the diode 23 is connected by way of a further node point to a second capacitor 24 with a capacitance value C2 and to a second coil 25 with an inductance value L2. The other connection of the second capacitor 24 is connected to ground, while the other connection of the second coil 25 is connected to the processor 18.

FIG. 4 shows a graph of a measurement value (detector voltage) LMW measured by the microwave leakage sensor 10, 11 of the household microwave appliance 1 in millivolts, representing a strength of the microwave leakage radiation, against the rotation angle φ of the rotary antenna 7 for slightly more than a full rotation of the rotary antenna 7. The measurement value LMW can be tapped for example at the output of the evaluation circuit 10 leading to the processor 18.

Due to the cyclical nature of the antenna rotation, the measurement values LMW are repeated approximately after one rotation (Δφ=360°). The profile of the measurement values LMW is logarithmically proportional to the measured field strength of the microwaves. Angle ranges with a practically constant voltage profile are shown as well as jump points. One surprising finding is that this voltage profile enables direct conclusions to be drawn about modifications of the field distribution of the microwaves in the cooking chamber 2. In particular it has been found by experimentation that the jump points correspond with a very high degree of reliability to a change in the mode pattern in the cooking chamber 2. The change in the mode pattern can be determined for example by experimentation using a "light board" as described in US 2008/0302958 A1. Angle ranges with almost constant measurement values LMW also show a constant brightness pattern of the light board, while switching of the mode pattern can be seen directly in the voltage profile. This is described in more detail in FIG. 8 as detailed below.

Within the angle ranges I to VII shown, there is only a slight change in the mode pattern. This becomes particularly clear for example for the angle range V and there between approx. φ=130° and φ=160°, the angle range VI and there between approx. φ=190° and φ=250° and the angle range VII and there between approx. φ=290° and φ=335°.

A possible variant for the automated determination of the operating points of the rotary antenna 7 at the appliance can include the following subsequent steps:

curve smoothing of the curve shown in FIG. 4,
determining the curve gradient of the smoothed curve,
forming the magnitude of the curve gradient,
data reduction, and from it
determination of the operating points of the rotary antenna 7.

Optional curve smoothing advantageously reduces the influence of measurement errors. The curve gradient, expressed as ΔLMW/Δφ or ∂LMW/∂φ for example, provides information on rising and falling edges of the (smoothed) measurement value profile.

Since only the absolute change in the measurement value profile or the absolute curve gradient is of interest here, an additional magnitude is optionally formed.

FIG. 5 shows a first derivation of the smoothed curve shown in FIG. 4 as a graph of a magnitude of the change in measurement value |ΔLMW/Δφ| against the rotation angle φ of the rotary antenna 7.

In the following step the data is reduced to switching points, for example by selecting the values with local maximum gradient. The change from one mode pattern to another takes place at these for example interpolated switching points.

FIG. 6 shows a graph of switching points U1 to U7 ("0" not present, "1" present) determined correspondingly from the curve from FIG. 5 against the rotation angle φ of the rotary antenna 7, in other words the rotation angles φ or angular positions of the switching points U1 to U7. Operating points of the cooking appliance can be determined in a manner that is easy to implement from these: the particularly advantageous operating points are each located centrally between two adjacent switching points U1, U2; U2, U3 etc., i.e. at a rotation angle φ=(φ(U2)−φ(U1))/2; etc. In the present exemplary embodiment, these are at least approximately the rotation angles φ=10°, 50°, 75°, 110°, 145°, 225° and 315°. Possible field distributions or mode patterns are shown in more detail below in FIG. 8.

This sequence for determining the operating points can be performed at the start of a microwave operating sequence and can be referred to as an initial scan.

The control facility 9 can be designed to activate the rotary antenna 7 or the associated stepper motor following the initial scan so that the different mode patterns associated with the different operating points are held for the same time periods and the item being cooked is therefore exposed for time segments of equal length (and no longer in proportion to the angle portion that the mode patterns assume during one rotation). This significantly reduces the risk of any disadvantageous formation of hotspots at the same points in the item being cooked for longer periods of time without change.

For advanced cooking controls it is also advantageous that it can be established practically without a time delay when a change to the setting parameters leads to a change in the resulting mode pattern and therefore in the same way to a change in the heat distribution in the item being cooked.

Of course, other evaluation methods can also be used to determine the operating points. For example zeros of the derivation of the curve profile from FIG. 4 can also be selected. This allows extreme points as well as turning and terrace points to be detected.

In addition the method is generally not limited to household appliances, the mode variation apparatus of which has only a single setting parameter or degree of freedom (such as the rotation angle φ of the rotary antenna 7) but can also be used with multiple degrees of freedom (e.g. the rotation angles of at least two rotatable antennas or other field-modifying elements such as a mode stirrer).

Generally not only the leakage rate within the housing has to be examined but any microwave leakage radiation exiting from the cooking chamber can be used to determine the operating points. This also includes microwave radiation that exits in the region of the closed door (i.e., "classic" leakage radiation in the front region). Measurement of the microwave leakage radiation is therefore not limited to the interior of the housing.

FIG. 8 shows several camera images of a "light board" that match the measured curve profile of the graph from FIG. 4. The associated angle range and the rotation angle φ of the rotary antenna 7 are shown for each image. The light sources, which can be excited to light up by microwaves and which can be fastened to a Styrofoam plate for example in the manner of a matrix, serve here as indicators for the field distribution present in the cooking chamber 2. The higher the local microwave power, the brighter a light source shines.

The resulting light patterns are shown here for the rotation angles φ=0°, 50°, 75°, 106°, 130°, 160°, 190°, 240°, 290° and 335°. Each of the associated angle ranges I-VII has an individual light pattern. In contrast the field distribution of the microwaves in the cooking chamber 2 remains practically unchanged within one of the angle ranges I-VII. This is shown by way of example for the angular degrees 130° and 160° in the angle range V, for the angular degrees 190° and 240° in the angle range VI and for the angular degrees 290° and 335° in the angle range VII.

The present invention is of course not limited to the exemplary embodiment shown.

Generally "one" can be understood to mean a singular or a plurality, in particular in the sense of "at least one" or "one or more" etc., unless this is specifically excluded, for example by the expression "just one" etc.

Number data can also cover just the specified number as well as a standard tolerance range, unless this is specifically excluded.

The invention claimed is:

1. A household microwave appliance, comprising:

a cooking chamber exposable to microwaves;

a mode variation apparatus designed to modify a field distribution of the microwaves in the cooking chamber; and a microwave leakage sensor designed to detect a microwave leakage radiation exiting from the cooking chamber, said household microwave appliance being designed to vary setting values of the mode variation apparatus, and to set an operating point of the mode variation apparatus based on a quantity of measurement data of the detected microwave leakage radiation resulting from a variation.

2. The household microwave appliance of claim 1, wherein the household microwave appliance is designed to pass through a setting range of the mode variation apparatus, to measure a strength of the microwave leakage radiation for respective ones of the set values of the setting range passed through; and to determine from a resulting curve profile a characteristic property for setting the operating point.

3. The household microwave appliance of claim 2, wherein the characteristic property includes switching points at which a significant modification of the field distribution occurs, said household microwave appliance being designed to set the operating point of the mode variation apparatus such as to lie outside the switching points.

4. The household microwave appliance of claim 3, wherein the household microwave appliance is designed to set the operating point centrally between adjacent ones of the switching points.

5. The household microwave appliance of claim 3, wherein the switching points are determined from turning points of the curve profile.

6. The household microwave appliance of claim 1, wherein the characteristic property includes extreme and/or terrace points of the curve profile, said household microwave device designed to set the extreme and/or terrace points as operating points of the mode variation apparatus.

7. The household microwave appliance of claim 1, wherein the mode variation apparatus comprises an apparatus selected from the group consisting of rotary antenna, turntable, mode stirrer, microwave generator, and any combination thereof.

8. The household microwave appliance of claim 1, wherein the microwave leakage sensor is designed to measure the microwave leakage radiation passing through a wall of the cooking chamber.

9. The household microwave appliance of claim 1, wherein the microwave leakage sensor is designed to measure the microwave leakage radiation passing through a door gap between a housing flange and a door that closes the cooking chamber.

10. The household microwave appliance of claim 1 wherein the microwave leakage sensor comprises a sniffer line.

11. A method for operating a household microwave appliance, said method comprising:

varying setting values of a mode variation apparatus designed to modify a field distribution of microwaves in a cooking chamber of the household microwave appliance;

measuring a detected microwave leakage radiation exiting from the cooking chamber for the different setting values of the mode variation apparatus; and setting operating points of the mode variation apparatus based on the detected microwave leakage radiation.

12. The method of claim 11, further comprising:

determining in response to the detected microwave leakage radiation switching points at which a marked modification of the field distribution of the microwaves occurs within the cooking chamber; and setting the operating points of the mode variation apparatus to lie outside the switching points.

* * * * *